United States Patent
Holmquist et al.

(10) Patent No.: US 9,602,957 B2
(45) Date of Patent: Mar. 21, 2017

(54) CROSS DEVICE INFORMATION EXCHANGE USING GESTURES AND LOCATIONS

(71) Applicant: EXCALIBUR IP, LLC, Sunnyvale, CA (US)

(72) Inventors: Lars Erik Holmquist, San Francisco, CA (US); Yash Dayal, Bangalore (IN)

(73) Assignee: EXCALIBUR IP, LLC, Sunnyvale, CA (US)

( * ) Notice: Subject to any disclaimer, the term of this patent is extended or adjusted under 35 U.S.C. 154(b) by 0 days.

(21) Appl. No.: 15/243,264

(22) Filed: Aug. 22, 2016

(65) Prior Publication Data

US 2016/0373885 A1 Dec. 22, 2016

Related U.S. Application Data

(63) Continuation of application No. 14/051,218, filed on Oct. 10, 2013, now Pat. No. 9,426,605.

(51) Int. Cl.

| H04B 7/00 | (2006.01) |
| H04W 4/00 | (2009.01) |
| H04M 1/725 | (2006.01) |
| H04W 84/18 | (2009.01) |
| H04W 88/06 | (2009.01) |

(52) U.S. Cl.
CPC ......... *H04W 4/008* (2013.01); *H04M 1/7253* (2013.01); *H04W 84/18* (2013.01); *H04W 88/06* (2013.01)

(58) Field of Classification Search
CPC ..... H04W 4/008; H04W 84/18; H04W 88/06; H04M 1/7253

USPC ........................................................ 455/41.2
See application file for complete search history.

(56) References Cited

U.S. PATENT DOCUMENTS

| 8,577,422 B1 * | 11/2013 | Ledet ...................... G06F 3/011 345/173 |
| 8,902,181 B2 * | 12/2014 | Hinckley .............. G06F 3/0487 345/173 |
| 8,928,589 B2 * | 1/2015 | Bi .......................... G06F 3/0425 345/168 |

(Continued)

OTHER PUBLICATIONS

Holmquist et al., "Smart-Its Friends: A Technique for Users to Easily Establish Connections between Smart Artefacts"; UbiComp '01: Proceedings of the 3rd international conference on Ubiquitous Computing, Jan. 1, 1900 Atlanta, Georgia, USA (2001).

(Continued)

*Primary Examiner* — April G Gonzales
(74) *Attorney, Agent, or Firm* — James J. DeCarlo; Greenberg Traurig, LLP

(57) ABSTRACT

A method, apparatus and software related product (e.g., a computer readable memory) are presented for exchanging information between two or more devices when they are in a close proximity using gestures and web technologies. According to an embodiment, the identification of one or more devices using gestures is asynchronous, so that the two or more devices do not have to be shaken together at the same time synchronously, which is one advantage over conventional approaches. Another advantage is that various embodiments described herein do not require a user to download any special software (application), and it can work on all platforms, for example, with HTML5-compliant browsers.

20 Claims, 8 Drawing Sheets

(56) References Cited

U.S. PATENT DOCUMENTS

| | | | | |
|---|---|---|---|---|
| 2011/0187652 A1* | 8/2011 | Huibers | ............... | G06F 3/0418 345/173 |
| 2011/0191438 A1* | 8/2011 | Huibers | ................ | G06F 15/16 709/217 |
| 2011/0191823 A1* | 8/2011 | Huibers | ................ | H04W 4/00 726/3 |
| 2013/0044130 A1* | 2/2013 | Geisner | ................... | G09G 5/00 345/633 |
| 2013/0089244 A1* | 4/2013 | Acosta-Cazaubon | ......... | G06Q 30/0241 382/118 |
| 2013/0169546 A1* | 7/2013 | Thomas | ............... | G06F 9/4451 345/173 |
| 2013/0172022 A1* | 7/2013 | Seymour | .............. | H04M 19/04 455/458 |
| 2013/0174100 A1* | 7/2013 | Seymour | .............. | G06F 3/0487 715/863 |
| 2014/0106710 A1* | 4/2014 | Rodriguez | ......... | H04M 1/7253 455/411 |

OTHER PUBLICATIONS

Hinckley, "Synchronous Gestures for Multiple Persons and Computers"; Proc. UIST 2003 Symp. on Users interface Software and Technology, Vancouver, Canada, pp. 149-158 (2003).

Rekimoto et al., "SyncTap: An Interaction Technique for Mobile Networking"; Human-Computer Interaction with Mobile Devices and Services Lecture Notes; Computer Science vol. 2795, pp. 104-115 (2003).

* cited by examiner

US 9,602,957 B2

CROSS DEVICE INFORMATION EXCHANGE USING GESTURES AND LOCATIONS

This application is a continuation of and claims the benefit of U.S. patent application Ser. No. 14/051,218, filed on Oct. 10, 2013, now U.S. Pat. No. 9,426,605, which is hereby incorporated by reference herein in its entirety.

FIELD

The present disclosure relates to communication between devices, and more specifically to exchange information between two or more devices when they are in a close proximity using gestures and web technologies.

BACKGROUND

The idea of synchronizing two devices using a combination of location and motion was originally presented by Holmquist et al. (see Holmquist, Lars Erik and Mattern, Friedemann and Schiele, Bernt and Alahuhta, Petteri and Beigl, Michael and Gellersen, Hans (2001) Smart-Its Friends: A Technique for Users to Easily Establish Connections between Smart Artefacts. In: *UbiComp '01: Proceedings of the 3rd international conference on Ubiquitous Computing*, 1900-01-01, Atlanta, Ga., USA). This system was built using specialized hardware based on the Smart-Its sensor nodes. Each device had an accelerometer (sensor) and a radio transceiver. By monitoring the motion signature of all devices in range, the system could determine if two or more devices were being shaken together at the same time. It could then open up a dedicated wireless connection between them.

An alternative version of the same mechanism was presented as "bumping" (see Hinckley, K., Ramos, G., Guimbretiere, F., Baudisch, P., and Smith, M. (2003) Synchronous Gestures for Multiple Persons and Computers. In *Proc. UIST 2003 Symp. on User interface Software and Technology*, Vancouver, Canada, pp. 149-158). This was implemented by attaching the accelerometer (sensor) to mobile computers connected to the same wireless network. Today the necessary hardware is available in standard smartphones and tablets. A variant method was introduced around the same time, Synctap, which instead uses the standard buttons on two devices on the same network (see Jun Rekimoto, Yuji Ayatsuka, Michimune Kohno. SyncTap: An Interaction Technique for Mobile Networking Human-Computer Interaction with Mobile Devices and Services Lecture Notes in Computer Science Volume 2795, 2003, pp 104-115).

A commercial version of this interaction technique was released in 2009 as Bump for iPhone and Android (see www.bu.mp, and US Patent Application Publications 2011/0191823, US 2011/0191438 and US 2011/0187652, all published on Aug. 4, 2011). It uses the same principle of co-located motion. It then compares synchronous motion signatures of devices with the approximate same physical location. When two phones are synchronously "bumped", they can establish a connection over a standard internet protocol, in order, for instance, to exchange photos or business cards.

SUMMARY

According to a first aspect, a method comprising: receiving by a server from a first device, a request for a gesture token, the request comprising a location of the first device; determining a first gesture token for the first device; storing a first device entry comprising the location of the first device and the first gesture token in a data storage; receiving from a mobile device a captured signal comprising a confirmation of detecting by the mobile device a predefined mobile device movement, the captured signal further comprising a location of the mobile device, the captured signal being asynchronous in time with the received request for the gesture token; matching the received capturing signal to stored entries comprising the first device entry; and, if the match is uniquely found with the first device entry, including the match between the locations of the first device and the mobile device and between the first gesture token and the predefined mobile device movement; and performing one or more actions related to one or more of the first device and the mobile device.

In another aspect, the data storage is located at the server.

In another aspect, an accelerometer sensor in the mobile device is used for detecting said predefined mobile device movement.

In another aspect, in response to receiving by the server the request for the gesture token from the first device, the method comprises: sending by the server a signal comprising a first gesture token to the first device, so that the predefined mobile device movement is provided to the mobile device by the user of the mobile device in response to information displayed on the first device, the displayed information comprising, at least partially, instructions about the predefined mobile device movement based on the first gesture token received by the first device from the server, wherein the captured signal being asynchronous in time with the sent signal comprising the first gesture token.

In another aspect, the first device is a stationary television set.

In another aspect, communication of the server with the first device and the mobile device is based on HTML5-compliant browsers without a need for a special application loaded to the first device and the mobile device.

In another aspect, the mobile device is a smart phone, a tablet, a portable computer or a wireless device.

In another aspect, information displayed on the first device comprises an advertisement and instructions include the predefined mobile device movement for getting a coupon related to the advertisement, and if the match is found between the locations of the first device and the mobile device and between the first gesture token and the predefined mobile device movement confirmed in the captured signal, providing the coupon to the mobile device.

In another aspect, the coupon content is dependent on a personal information of the user of the mobile device.

In another aspect, information displayed on the first device comprises instructions including the predefined mobile device movement for establishing the chatting session, and if the match is found between the locations of the first device and the mobile device and between the first gesture token and the predefined mobile device movement confirmed in the captured signal, providing a chat box to the first device and to the mobile device for chatting with the other mobile devices.

In another aspect, information displayed on the first device comprises instructions including the predefined mobile device movement for getting a special event displayed, and if the match is found between the locations of the first device and the mobile device and between the first gesture token and the predefined mobile device movement confirmed in the captured signal, providing the special event displayed on the mobile device.

In another aspect, information displayed on the first device provides instructions to the user of the mobile device for voting during contest broadcasting on the first device, where the instructions include the predefined mobile device movement for voting one way and a further predefined mobile device movement for voting another way, and after the match is found between the locations of the first device and the mobile device and between the first gesture token and the predefined mobile device movement or the further predefined mobile device movement confirmed in the captured signal, providing a corresponding count for the voting one way or another way.

In another aspect, the locations of the mobile device and the first device are determined in three-dimensions.

In another aspect, the match between the locations of the first device and the mobile device is found if a distance between the locations is below a predefined value.

In another aspect, the method further comprises: receiving by a server from a second device, a second request for the gesture token, the request comprising a location of the second device; determining by the server that a difference between locations of the first and second devices is below a predefined value; determining a second gesture token which is different than the first gesture token; storing a further entry comprising the location of the second device and the second gesture token in a data storage; sending by the server a signal comprising the second gesture token to the second device; receiving from a further mobile device a further captured signal comprising a further confirmation of detecting by the further mobile device a further predefined mobile device movement which is provided to the further mobile device by the user of the further mobile device in response to information displayed on the second device, the displayed information comprising, at least partially, instructions about the further predefined mobile device movement based on the second gesture token received by the second device from the server, the further captured signal comprising a location of the further mobile device, the further captured signal being asynchronous in time with the received second request for the gesture token; matching the received further captured signal to the further stored entry; and, if the match is found between the locations of the second and further mobile devices and between the second gesture token and the detected predefined further mobile device movement; and providing a further instruction for performing one or more actions related to one or more of the second device and the further mobile device.

According to a second aspect, a method comprising: sending, by a first device to a server, a request for a gesture token, the request comprising a location of the first device; receiving, by the first device from the server, a signal comprising a first gesture token; and displaying by the first device information based on the first gesture token, information comprising an instruction to a user of a mobile device located in a close proximity to the first device how to provide a predefined mobile device movement for generating by the mobile device a captured signal comprising a confirmation of detecting by the mobile device said predefined mobile device movement.

In another aspect, if a match is found between locations of the first device and the mobile device and between the first gesture token and the predefined mobile device movement performed by the user of the mobile device and confirmed in the captured signal, the method further comprises: receiving by the first device from the server an instruction for performing one or more actions related to the mobile device.

In another aspect, the method further comprises: determining by the first device the location of the first device.

In another aspect, after first gesture token further displaying URL uniform resource locator to be used by the mobile device before performing the predefined mobile device movement.

According to a third aspect, an apparatus comprising: a processor; a storage medium for tangibly storing thereon program logic for execution by the processor, the program logic comprising: receiving logic executed by the processor for receiving from a first device, a request for a gesture token, the request comprising a location of the first device; determining logic executed by the processor for determining a first gesture token for the first device; storing logic executed by the processor for storing a first device entry comprising the location of the first device and the first gesture token in a data storage; receiving logic executed by the processor for receiving from a mobile device a captured signal comprising a confirmation of detecting by the mobile device a predefined mobile device movement, the captured signal further comprising a location of the mobile device, the captured signal being asynchronous in time with the received request for the gesture token; matching logic executed by the processor for matching the received capturing signal to stored entries comprising the first device entry; and, if the match is uniquely found with the first device entry, including the match between the locations of the first device and the mobile device and between the first gesture token and the predefined mobile device movement; and performing logic executed by the processor for performing one or more actions related to one or more of the first device and the mobile device.

According to a fourth aspect, a non-transitory computer readable storage medium tangibly storing computer program instructions capable of being executed by a computer processor, the computer program instructions defining code for: receiving by a server from a first device, a request for a gesture token, the request comprising a location of the first device; determining a first gesture token for the first device; storing a first device entry comprising the location of the first device and the first gesture token in a data storage; receiving from a mobile device a captured signal comprising a confirmation of detecting by the mobile device a predefined mobile device movement, the captured signal further comprising a location of the mobile device, the captured signal being asynchronous in time with the received request for the gesture token; matching the received capturing signal to stored entries comprising the first device entry; and, if the match is uniquely found with the first device entry, including the match between the locations of the first device and the mobile device and between the first gesture token and the predefined mobile device movement; and performing one or more actions related to one or more of the first device and the mobile device.

According to a fifth aspect, an apparatus comprising: a processor; a storage medium for tangibly storing thereon program logic for execution by the processor, the program logic comprising: sending logic executed by the processor for sending to a server a request for a gesture token, the request comprising a location of the first device; receiving logic executed by the processor for receiving from the server a signal comprising a first gesture token; and displaying logic executed by the processor for displaying information based on the first gesture token, information comprising an instruction to a user of a mobile device located in a close proximity to the first device how to provide a predefined mobile device movement for generating by the mobile device a captured signal comprising a confirmation of detecting by the mobile device said predefined mobile device movement.

BRIEF DESCRIPTION OF THE DRAWINGS

For a better understanding of the nature and objects of the exemplary embodiments, reference is made to the following detailed description taken in conjunction with the following drawings. In the drawing figures, which are not to scale, and where like reference numerals indicate like elements throughout the several views.

DESCRIPTION OF EMBODIMENTS

Figure 1:
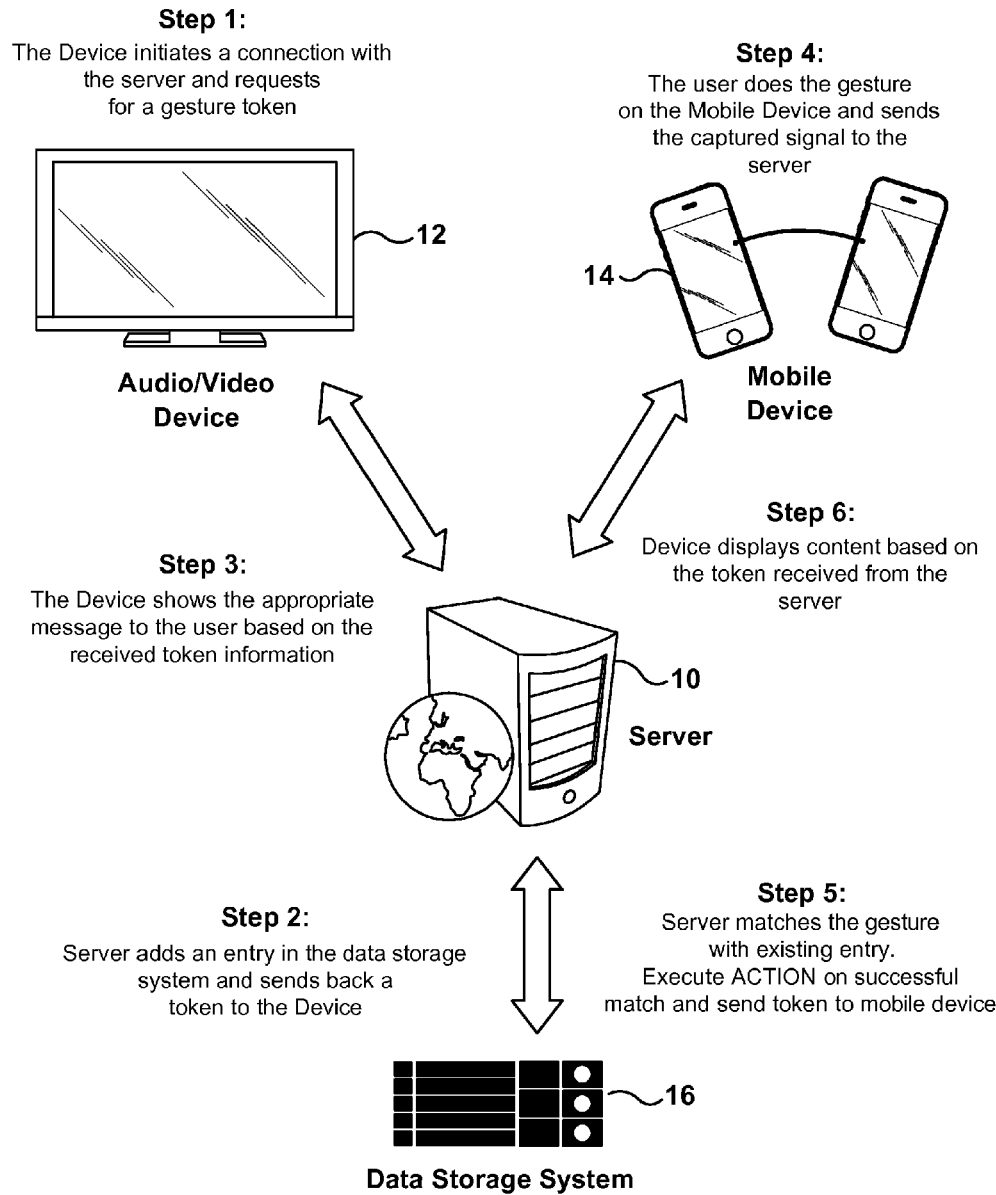
FIG. 1 is a pictorial illustration of an exemplary scenario for implementing embodiments described herein.

Embodiments are now discussed in more detail referring to the drawings that accompany the present application. In the accompanying drawings, like and/or corresponding elements are referred to by like reference numbers/characters throughout the drawings.

Various embodiments are disclosed herein; however, it is to be understood that the disclosed embodiments are merely illustrative of the disclosure that can be embodied in various forms. In addition, each of the examples given in connection with the various embodiments is intended to be illustrative, and not restrictive. Further, the figures are not necessarily to scale, some features may be exaggerated to show details of particular components (and any size, material and similar details shown in the figures are intended to be illustrative and not restrictive). Therefore, specific structural and functional details disclosed herein are not to be interpreted as limiting, but merely as a representative basis for teaching one skilled in the art to variously employ the disclosed embodiments.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

The present disclosure is described below with reference to block diagrams and operational illustrations of methods and devices to select and present media related to a specific topic. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved. Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

A method, apparatus and software related product (e.g., a computer readable memory or storage device) are presented for exchanging information between two or more devices when they are in a close proximity using gestures and web technologies. According to an embodiment, the identification of one or more devices using gestures is asynchronous, so that the two or more devices do not have to be shaken together at the same time synchronously, which is one advantage over conventional approaches. Another advantage is that various embodiments described herein do not require a user to download any special software application, and it can work on all platforms, for example, with HTML (hypertext markup language) such as HTML5-compliant (and likely later versions) browsers. This approach can use a sensor such as accelerometer on the device to establish a shared context, which is matched with nearby devices using a distributed architecture.

The embodiments described herein can have many application areas, for instance sending information from one device to another (e.g., sending a coupon from a TV to a phone during the screening of an advertisement), creating a secure connection between two or more devices (e.g., opening a Websocket for chatting or gaming), customizing content (e.g., overlaying information over a web page that corresponds to a show on the screen, such as sports scores when watching a football game), and much more. Although this could theoretically be solved using a conventional approach, e.g., using a specialized application with synchronized connection, but in practice no application or combination of applications will have the user coverage or easy access of the web.

According to one embodiment, a server of a network can receive from a first device (for example an audio/video device such as a stationary television set, a game console and the like) a request for a gesture token, the request comprising a location of the first device. This first device such as television may be a wired or wireless viewing device or a content receiver (referred to herein as a "television" as a non-limiting example) in communication with the server. In one embodiment, the television or viewing device can be a "smart" TV that can access the Internet or other wired or wireless network. The television can be any relatively stationary device, such as a set top box, gaming console (e.g., Xbox 360® developed by Microsoft Corporation®), streaming device, desktop computer, or any other device that can connect to the Internet and does not typically change location (but, in one embodiment, can change location). For example, the relatively stationary device can change location such as during a move to another room in a home, during a move to another home, etc. The relatively stationary device may be juxtaposed in this embodiment to a handheld mobile device or tablet that generally travels with a user wherever they go.

Moreover, the first device can have a capability to determine its own location at least in two-dimensions for example using GPS (global positioning system) or other conventional methods. It can be also possible to determine a position of the first device in three dimensions using emerging technologies. For example, the intensity of the detected signal in a Bluetooth or Wi-Fi transceiver can indicate which floor of a building a device is located, if the absolute strength of the transmitting device is known, and the location of the receiving device is also known. This feature may be useful for instance in multi-storied buildings to uniquely identify devices (such as TV sets) locates in different apartments on different floors having the same horizontal coordinates (e.g., in one apartment located below another apartment).

In response to the request for the gesture token, the server can determine/assign/provide a first gesture token for the first device, where the gesture token identifies a predefined movement for a plurality of mobile devices located in a close proximity to the first device in order to establish the desired connection. In addition to generating a first gesture token, the server can store an entry (among other similar entries form devices similar to the first device) comprising a location of the first device and the first gesture token in a data storage (the data storage may be a memory in the server device or a separate storage unit in the network).

Further, the server can receive a captured signal from a mobile device located in the vicinity/close proximity to the first device (the mobile device may be one of the mobile devices located in the close proximity to the first device). The mobile device can be a lightweight device such as smart phone, a tablet, a lightweight portable computer, a wireless phone and the like. It should be understood that the first device such as a stationary TV set may not be considered to be lightweight for the purposes of this invention, even though in general a miniature wireless device comprising a TV capability may be considered to be the mobile/lightweight device described herein.

Moreover, the captured signal can comprise a confirmation of detecting by the mobile device a predefined mobile device movement. The captured signal can further comprise a location of the mobile device (for example, determined using GPS. The predefined mobile device movement can be detected, for example, using an accelerometer sensor in the mobile device.

According to a further embodiment, the captured signal or the predefined mobile device movement (for the purpose of this invention timing of the captured signal and of the predefined mobile device movement coincide, even though in reality it is a small time delay between them) is asynchronous in time with the received request for the gesture token from the first device which uniquely separates this embodiment from the conventional approaches where signals detected from different devices have to be synchronous.

Then the server can match the received capturing signal to stored entries from devices comprising the first device entry (the device entries being similar to the entry for the first device). If the match is uniquely found with the first device entry (i.e., only with the first device entry) including the match between the locations of the first device and mobile device and between the first gesture token and the predefined mobile device movement (confirmed in the capture signal), then the server can perform one or more actions related to one or more of the first device and the mobile device, as elaborated in multiple application examples described below.

Moreover, according to a further embodiment, in response to receiving by the server the request for the gesture token from the first device such as a TV set, the server may further send a signal comprising a first gesture token to the first device. This information may be displayed on the first device (e.g., on the TV screen) and comprise instructions about the predefined mobile device movement based on the first gesture token, received by the first device from the server, and a URL (uniform resource locator) such as yahoo.com, to be entered by the user on the mobile device before performing the predefined mobile device movement in order to provide to the server the captured signal. In an alternative embodiment, as described herein, the mobile device can have the predefined instructions beforehand so that displaying of the information comprising the first gesture token on the first device may not be necessary.

Moreover, as stated herein, various embodiments do not require the user of the aforementioned devices to download any special software (application). It is intended to work on all platforms, for example, with HTML5-compliant browsers. It is expected that the same can be applied to later versions of the HTML-5 and the like.

FIG. 1 pictorially illustrates an exemplary scenario as in the described embodiment. It shows a server 10 with a data storage system 16, a stationary TV set (first device such as audio/video device) 12 and a mobile device 14. Steps 1-6 illustrate the embodiments described above with interactions between the devices indicated by errors.

Figure 2:
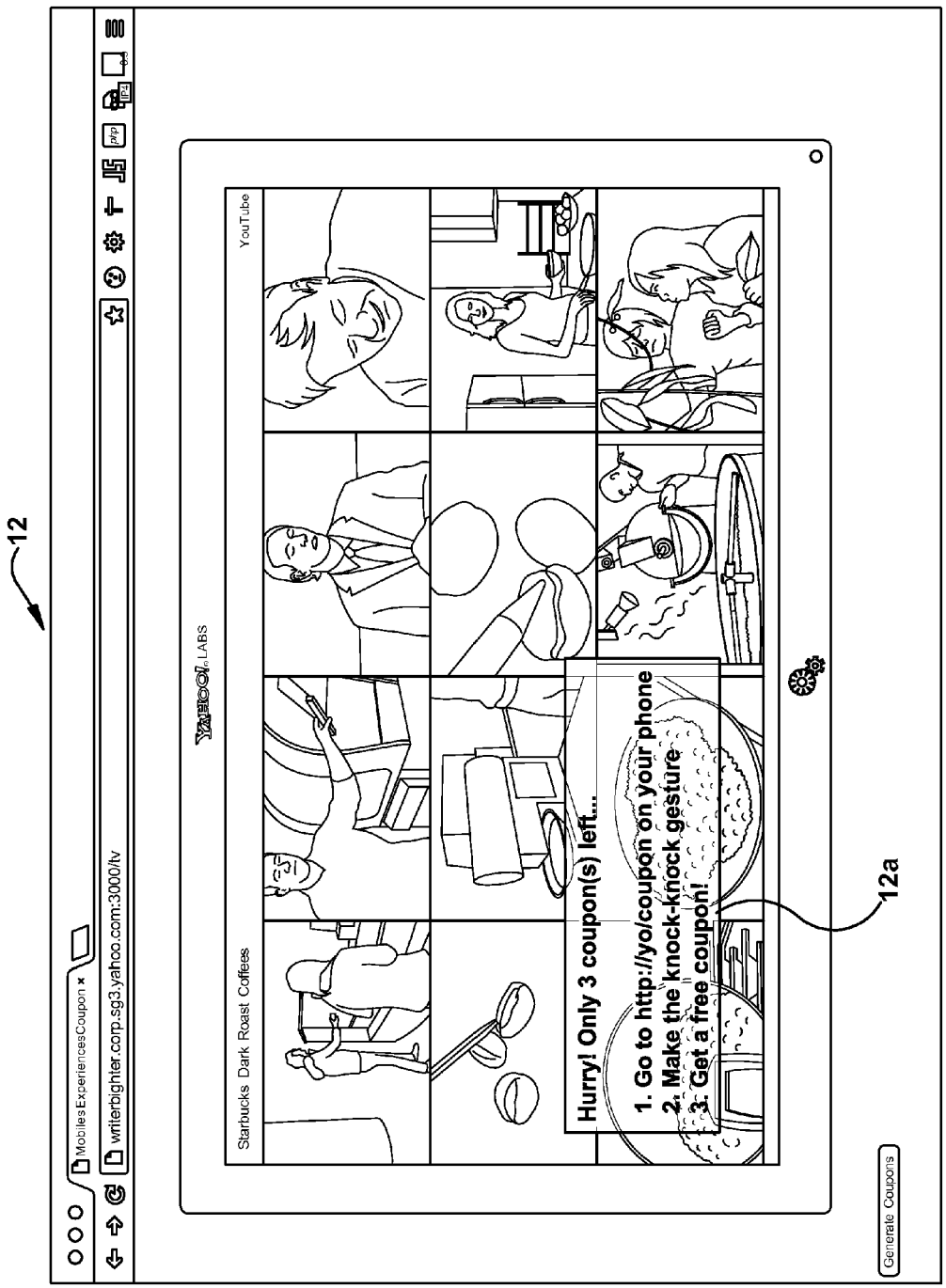
FIG. 2 is an exemplary illustration of a displayed image on a first device (such as TV set) with a dedicated area in the picture for instructions to users of mobile devices located in a close proximity of the first device, according to one embodiment.

FIG. 2 illustrates a picture displayed on the first device (TV set) 12 with an area 12a dedicated to instructions to users of mobile devices located in a close proximity. The instructions include URL (uniform resource locator) instructions, the predefined mobile device movement (knock-knock gesture) and getting a free coupon encouragement, as shown in FIG. 2.

Figure 3:
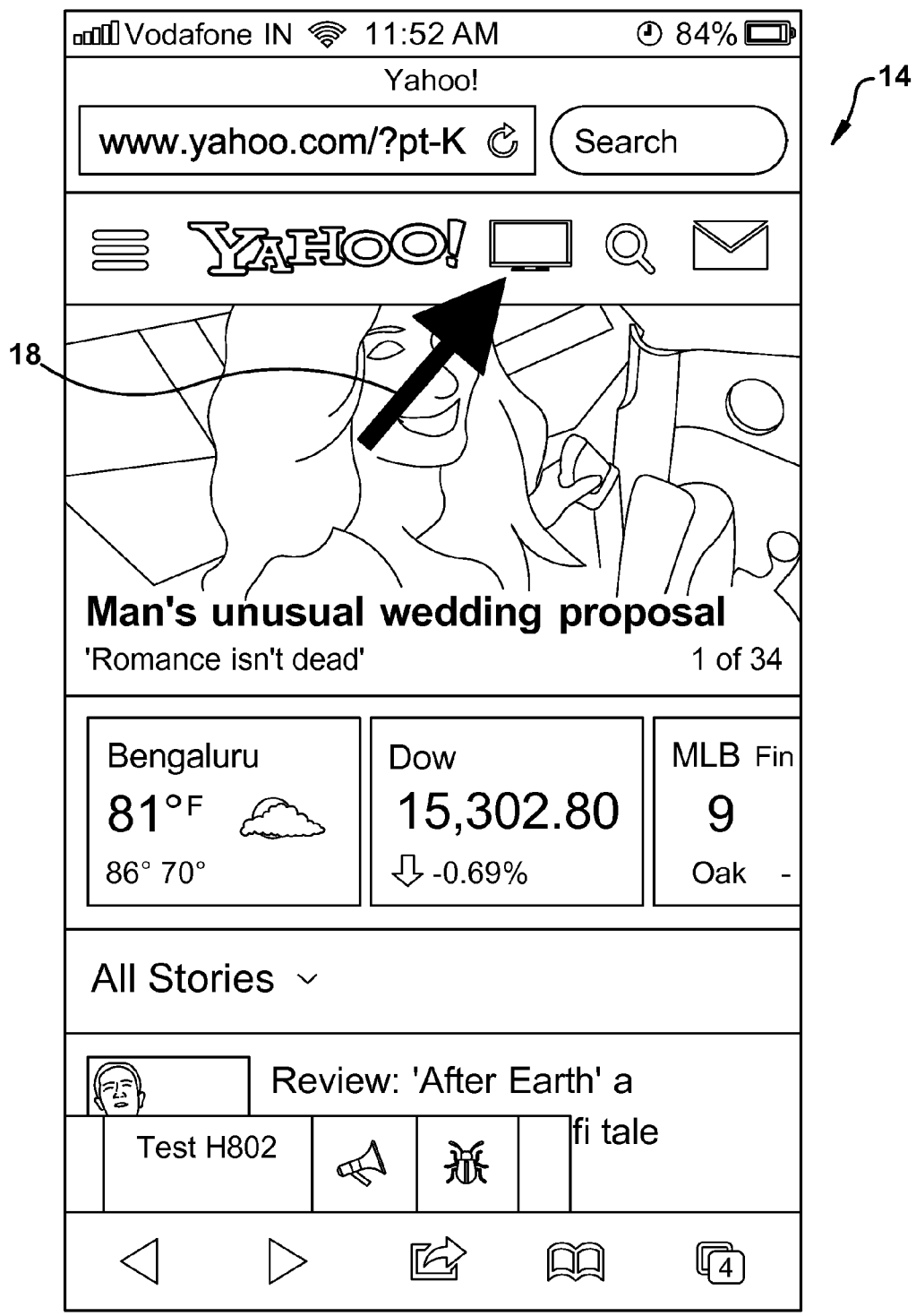
FIG. 3 is an exemplary illustration of a mobile device live Yahoo! page with a gesture overlay implemented with a button pressed before performing a gesture (i.e., a predefined mobile device movement)

FIG. 3 illustrates a mobile device live Yahoo page with a gesture overlay implemented with a button 18. The user presses this button 18 before performing a gesture (predefined mobile device movement), according to another embodiment.

Furthermore, it is noted that for practical implementation purposes of the above embodiments, matching between the locations of the first and mobile devices described herein can be found to be validated if a distance between reported locations of the first device and the mobile device is below a predefined value. This approach may be useful to avoid errors when one mobile device may be found to be matched to two devices such as first device (i.e., matched to two stationary TV sets). To further remedy the possibility of "matching" errors and to better handle a three-dimensional environment, the following procedure described below can be utilized, according to a further embodiment.

According to this further embodiment, the server can receive another request for the gesture token from a second device (e.g., another stationary TV set similar to the first device), the request comprising a location of the second device. The server next determines at the sever that a difference between locations of the first and second devices (e.g., in a two-dimensional coordinate system) is below a predefined value. This means that the locations of the first and second devices (e.g., TV sets in a multi-storied building located one below another) are undistinguishable (i.e., the first and second devices having the same locations). To remedy that ambiguity, the server can determine/assign/provide a second gesture token for the second device which is different than the first gesture token. Then the logical flow can be similar to the above description for the first device as described below.

The server can store a further entry (among other similar entries) comprising the location of the second device and the second gesture token in a data storage (the data storage may be a memory in the server device or a separate storage unit in the network). Then the server can send a signal comprising the determined second gesture token to the second device.

Next, the server can receive from a further mobile device a further captured signal comprising a further confirmation of detecting by the further mobile device a further predefined mobile device movement which is provided to the further mobile device by the user of the further mobile device in response to information displayed on the second device. The displayed information can comprise, at least partially, instructions about the further predefined mobile device movement based on the second gesture token received by the second device from the server, the further captured signal comprising a location of the further mobile device, wherein the further captured signal being asynchronous in time with the received second request for the gesture token.

Then the server can match the received further captured signal to the further stored entry. If the match is found between the locations of the second and further mobile devices and between the second gesture token and the detected predefined further mobile device movement, the server can provide a further instruction for performing one or more actions related to one or more of the second device and the further mobile device.

In the following, different exemplary web scenarios for applying various embodiment described herein are described. The "Web Friends" technology created using the disclosed technology can allow to connect any kind of a lightweight web-enabled device (tablet, phone, TV, etc.) to an appropriate destination, by performing simple pre-determined gestures. The purpose is to create new opportunities for asynchronized applications without requiring users to download specialized applications. In other words, the user does not need to download any applications to a corresponding device or modify the device in any way. It is enough if the user is already visiting an implementing web entity or property, such as by way of non-limiting example, a Yahoo! web property (e.g., m.yahoo.com) for the gestures to be relevant.

A coupon scenario example is described first. Getting coupons and deals from TV advertisements is an important function in a modern environment, as well as distributing links to applications. However, current solutions are largely inadequate. The most common solution is to display a phone number and encourage users to send a text to this number, which then returns a link to a product. The present disclosure lowers obstacles to adoption and use, resulting in improved ad responses.

The possible coupon event example-scenario can be as follows:
  A TV display is showing an advertisement with further shake/move instructions;
  When a user shakes a mobile device with an open page, the page redirects to a coupon, e.g., a bar code that can be saved on the device;
  To continue the demo, a new advertisement is shown on the TV display with similar instructions, resulting in a new deal being downloaded, or possibly an application or other resource becoming loaded instead.

In other words, in this scenario, information displayed on the first device such as a TV set comprises an advertisement, and displayed (optional) instructions which include at least the predefined mobile device movement for getting a coupon related to the advertisement. If the match is found between the locations of the first device and the mobile device, and between the first gesture token and the predefined mobile device movement confirmed in the captured signal, the coupon is provided to the mobile device (e.g., from the TV set to the mobile device by the server). It is noted that according to this embodiment, the coupon content provided to the mobile device can be dependent on personal information of the user of the mobile device, such as, for example, by accessing a user data base or preferences or other function or future targeting techniques.

Another scenario example is a multi-chat scenario, where people are often chatting to local and non-local friends about the content they are watching as well as other topics. In this scenario, it is advantageous to connect all devices in a room to a single chat room (this is similar to the current Web Friends scenario). In other words, this application can optionally overlay the chat room on the TV screen to facilitate a more public and shared space.

The possible multi-coupon event example-scenario can be as follows:
  A number of devices are in a room along with one stationary TV showing a program;
  Instructions are overlaid on the screen: A URL (e.g., yahoo.com) and "Shake to chat!";
  When a user visits the homepage and shakes the mobile device, a chat box gets overlaid on the homepage and connects to other active users;
  A chat box will also appear on the TV screen when users are connected, showing the live chat.

In other words, in this scenario, information displayed on the first device such as a stationary TV set comprises displayed (optional) instructions including at least the predefined mobile device movement for establishing the chatting session, and if the match is found between the locations of the first device and the mobile device and between the first gesture token and the predefined mobile device movement in the captured signal, providing, by the server, a chat box to the mobile device and possibly to the TV screen for chatting with the other mobile devices.

Another scenario example is a special event scenario, where many users access web pages (e.g., Yahoo pages) during specific events, e.g., to search information. Examples may be Superbowl, Grammies award show, etc. In some cases, special pages are created for these events that are sub-sections of Yahoo! properties (e.g., a Superbowl page for Sports). These pages are popular and receive a lot of hits, and this content is much better served as HTML than applications.

The possible special event example-scenario can be as follows:
  The TV is showing a special event and an overlaid URL, e.g., yahoo.com;
  Instructions are shown: "Shake your phone to go to the Event #1 Page!"
  When users shake their phone the URL reloads to a special event page;
  User then switches channel to another event (#2) with similar instructions;
  When the user shakes the phone, event #2 page URL is loaded.

In other words, in this scenario, information displayed on the first device such as a TV set comprises optional instructions including at least the predefined mobile device movement for getting the special event displayed, and if the match is found between the locations of the first device and the mobile device and between the first gesture token and the predefined mobile device movement confirmed in the captured signal, providing, by the server, the special event displayed on the mobile device. It is noted that according to this embodiment, a similar to the special event scenario which does not have a full event page, can be also implemented. For instance, if the user is browsing "sports" while watching a specific game, the gesture can call up current scores and background information for the game, which can enrich the use's experience.

Another scenario is polling and/or voting as commonly used in interactive TV. Most voting systems are based on phoning or texting a specific number for each choice, which works with any phone (and as the added advantage of providing a revenue stream). Using embodiments described herein, voting using light-weight devices can be provided, e.g., through disclosed embodiments herein.

The possible polling/voting example can be as follows:
  An event is shown on the TV, e.g. singing contest;
  A URL is constantly overlaid, e.g. yahoo.com;
  For each voting instance, instructions are shown: "If you like this, shake your phone up and down! If you don't like it, shake sideways!" Graphics are also supplied;
  The users vote by shaking their phones (mobile devices, tablets, etc.) in the suggested manner;
  A confirmation is shown on the phone and the results are tallied on the TV.

In other words, in this scenario, information displayed on the first device such as a TV set provides instructions to the user(s) of the mobile device(s) for voting during contest broadcasting on the first device, where the instructions include the predefined mobile device movement for voting one way and a further predefined mobile device movement for voting another way, and after the match is found for the location of the first device and the mobile device and between the first gesture token and the predefined mobile device movement or the further predefined mobile device movement confirmed in the captured signal, providing by the server a corresponding count for the voting one way or another way. The applicant respectfully submits that this application would also create a stronger feeling of participation if participants get physically involved in the voting! It is similar to clapping hands to show appreciation—a more visceral experience than pushing a button.

According to another scenario, a number of recommended shows can be presented on a screen as big icons. In this scenario a user can use the phone to "shake up" user's recommendations, so that the icons would visibly scramble and change positions, some would fall off and new ones would appear. This would be a fun way for the user to have some effect on the content, and the link could feel very direct because of the correspondence between shaking and the on-screen animation (each device would use the same gesture token; however, when connection is established, it would communicate the identity of the device owner, which is different from each device).

In another scenario, a combination of the on-screen content of a TV with the user's profile can be implemented, so that the result is optimized not just for the TV show but also the user. The possible example/scenario can be as follows. A TV is showing instructions like in the above examples. Two different users shake and connect. The pages the two users see are relevant for the on-screen show but different depending on their profile. For instance, somebody who is known to shop diapers would get a coupon for diapers whereas the person next to him/her does not have that interest and would get something else based on their profile. Similar for, e.g., Grammy Awards, the displayed content could be tailored to favorite artists.

In many of the above scenarios, an alternative interaction model can be used, where the shaking gesture is only used to establish the connection once. When it has been established, the TV can then continuously push updates through the URL so that the user's device content is always synchronized with the on-screen content. Only when there is a change of channels or the user wants to optimize output, registering a new gesture is necessary.

Figure 4:
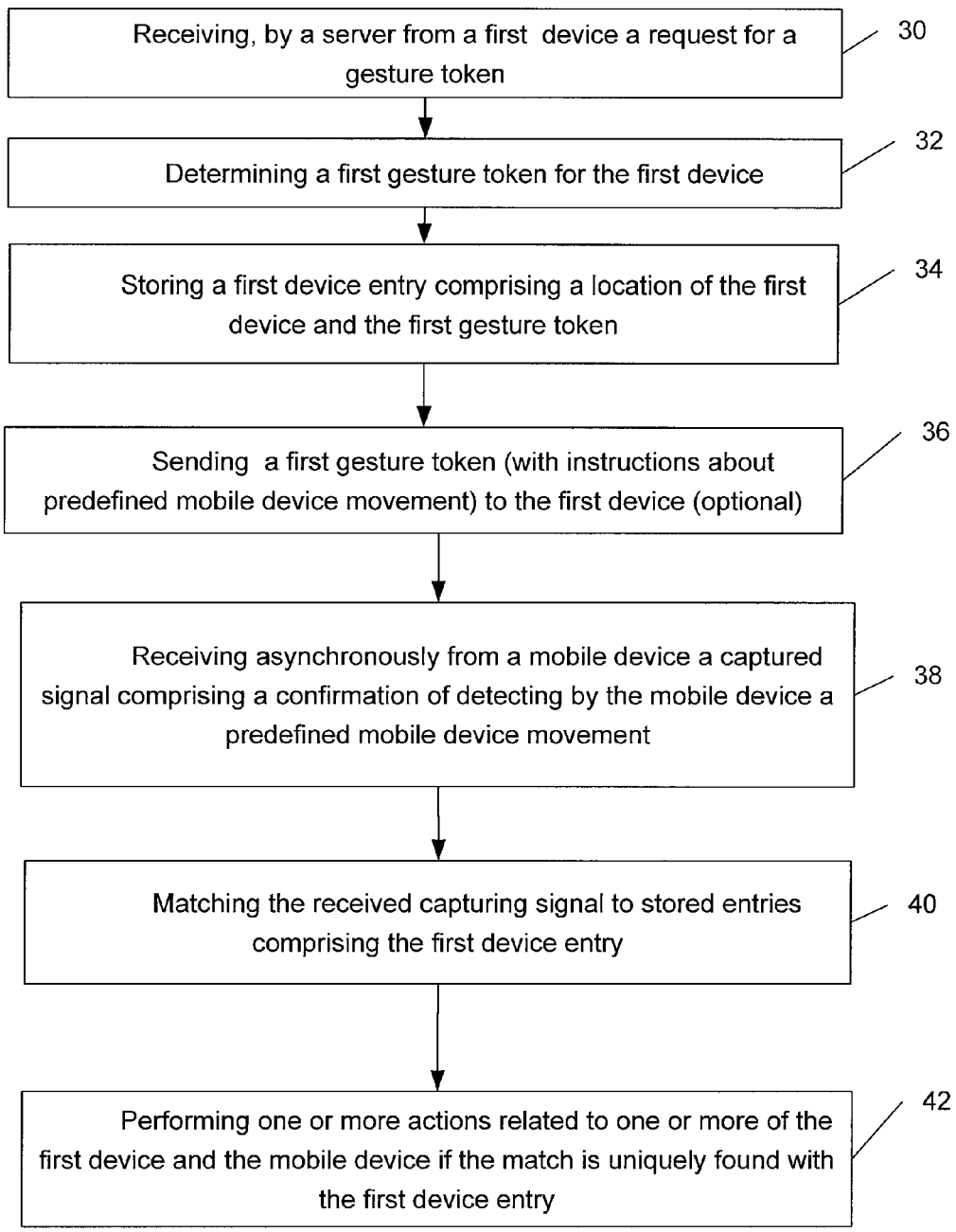
FIG. 4 is a flow chart illustrating implementation of various embodiments by a first device such as a stationary TV set.

With reference now to FIG. 4, shown is an exemplary flow chart demonstrating implementation of the various illustrated embodiments described herein by a server. It is noted that the order of steps shown in FIG. 4 is not required, so in principle, the various steps may be performed out of the illustrated order. Also certain steps may be skipped, different steps may be added or substituted, or selected steps or groups of steps may be performed in a separate application following the embodiments described herein.

In a method according to the embodiment shown in FIG. 4, in a first step 30 a server of a network receives from a first device (e.g., stationary TV set), a request for a gesture token, the request can comprise a location of the first device (which can be determined, for example by the first device itself).

In a next step 32, the server determines/assigns a first gesture token for the first device.

In a next step 34, the server stores in a data storage a first device entry comprising the location of the first device and the first gesture token.

In a next optional step 36, the server sends to the first device a signal comprising a first gesture token for displaying by the first device information comprising (at least partially) instructions about the predefined mobile device movement based on the first gesture token received by the first device from the server.

In a next step 38, the server receives from a mobile device a captured signal comprising a confirmation of detecting by the mobile device a predefined mobile device movement, the captured signal can further comprise a location of the mobile device (which can be determined, for example by the mobile device itself), wherein the captured signal being asynchronous in time with respect to the received request for the gesture token.

In a next step 40, the server matches the received capturing signal to stored entries comprising the first device entry. If the match is uniquely found with the first device entry including the match between the locations of the first device and the mobile device and between the first gesture token and the predefined mobile device movement as reported and confirmed in the captured signal, in a next step 42, the server performs one or more actions related to one or more of the first device and the mobile device, as described herein in detail.

Figure 5:
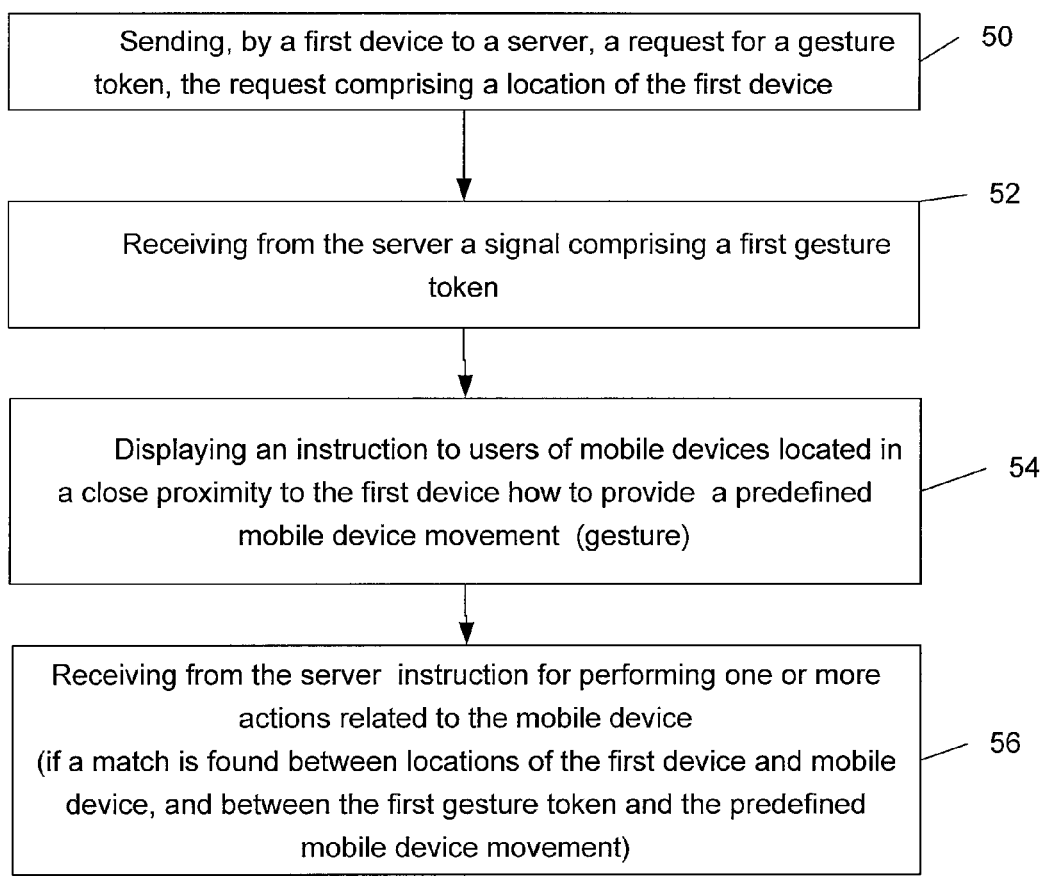
FIG. 5 is a flow chart illustrating implementation of various embodiments by a mobile device.

With reference now to FIG. 5, shown is an exemplary flow chart demonstrating implementation of the various illustrated embodiments described herein by a first device such as a TV set (a stationary device). It is noted that the order of steps shown in FIG. 5 is not required, so in principle, the various steps may be performed out of the illustrated order. Also certain steps may be skipped, different steps may be added or substituted, or selected steps or groups of steps may be performed in a separate application following the embodiments described herein.

In a method according to the embodiment shown in FIG. 5, in a first step 50 a first device such as TV set sends to a server a request for a gesture token, the request comprising a location of the first device (which can be determined/assigned, for example, by the first device itself).

In a next step 52, the first device/TV set receives from the server a signal comprising a first gesture token.

In a next step 54, the first device/TV set displays information based at least on the first gesture token, information comprising an instruction to a user of a mobile device (or users of mobile devices) located in a vicinity/close proximity of the first device how to provide a predefined mobile device movement for generating by the mobile device a captured signal comprising a confirmation of detecting by the mobile device said predefined mobile device movement.

In a next step 54, the first device/TV set receives from the server an instruction for performing at least one action related to the mobile device (if a match is found by the server between locations of the first device and the mobile device and between the first gesture token and the predefined mobile device movement of the mobile device confirmed in the captured signal).

Figure 6:
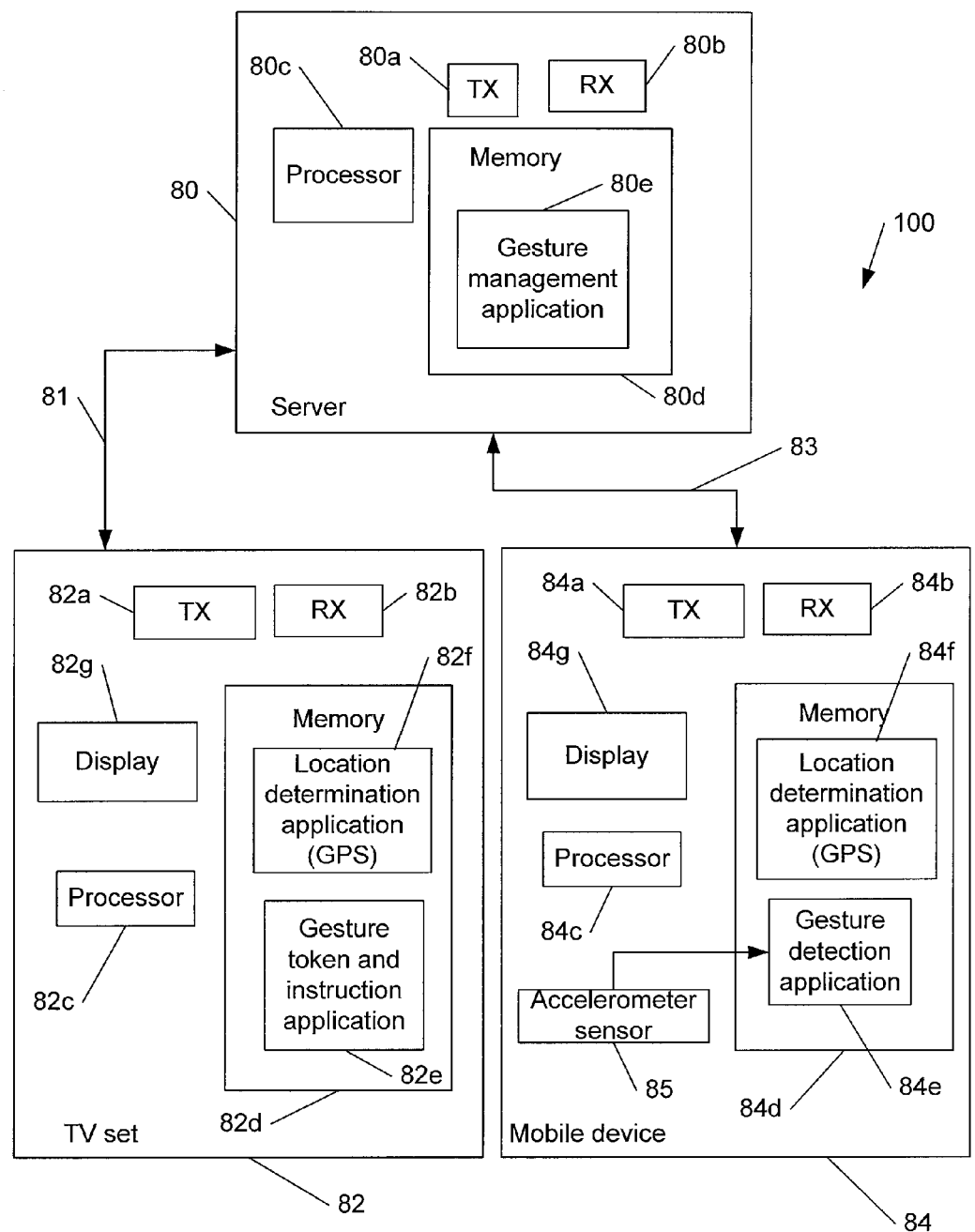
FIG. 6 is an exemplary block diagram of devices for implementation of various embodiments.

FIG. 6 shows an exemplary embodiment of a network system 100 comprising at least a server 80, a first device (e.g., a stationary TV set) and a mobile device 84 among a plurality of other mobile devices (not shown in FIG. 6) located in a vicinity/close proximity to the first (TV) device 82. The mobile device 84 may be a mobile/lightweight device such as smart phone, a tablet, a lightweight portable computer, a wireless phone, etc. FIG. 6 is a simplified block diagram of various devices that are suitable for practicing the exemplary embodiments; components of a computing device are configured to cause that electronic device to operate.

The server 80 may comprise, e.g., at least one transmitter 80a, at least one receiver 80b, at least one processor 80c, at least one memory 80d and a gesture management application module 80e. The transmitter 80a and the receiver 80b may be configured to provide a wireless or wired communication with the first (TV) device 82 test (e.g., through a corresponding link 81) and with a mobile device 84 located in a vicinity/close proximity to the first device 82 (e.g., through a corresponding link 83). The transmitter 80a and the receiver 80b may be generally means for transmitting/receiving and may be implemented as a transceiver, or a structural equivalence thereof. It is further noted that the same requirements and considerations are applicable to transmitters (82a and 84a) and receivers (82b and 84b) of the devices 82 and 84.

Various embodiments of a memory 80d (e.g., computer readable memory) in the server 80 may include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. The same considerations may be applicable to the memories 82d and 84d in the corresponding devices 82 and 84. Various embodiments of the processor 80c include but are not limited to general purpose computers, special purpose computers, microprocessors, digital signal processors (DSPs) and multi-core processors. Similar embodiments are applicable to processors 82c and 84c in the corresponding devices 82 and 84.

The gesture management application module 80e in the server 80 can provide instructions to perform and/or assist in performing steps 30-42 shown in FIG. 4, using the communication links 81 and 83. The module 80e may be implemented as an application computer program stored in the memory 80d, but in general it may be implemented as software, firmware and/or hardware module or a combination thereof. In particular, in the case of software or firmware, one embodiment may be implemented using a software related product such as a computer readable memory (e.g., non-transitory computer readable memory), computer readable medium or a computer readable storage structure comprising computer readable instructions (e.g., program instructions) using a computer program code (i.e., the software or firmware) thereon to be executed by a computer processor. Furthermore, the module 80e may be implemented as a separate block or may be combined with any other module/block of the server (computing) device 80, or it may be split into several blocks according to their functionality.

The gesture token and instruction application module 82*e* in the first device 82 may provide various instructions for performing steps 50-56 shown in FIG. 5, using the communication link 81. The module 82*e* may be implemented as an application computer program stored in the memory 82*d*, but in general it may be implemented as software, firmware and/or hardware module or a combination thereof. In particular, in the case of software or firmware, one embodiment may be implemented using a software related product such as a computer readable memory (e.g., non-transitory computer readable memory), computer readable medium or a computer readable storage structure comprising computer readable instructions (e.g., program instructions) using a computer program code (i.e., the software or firmware) thereon to be executed by a computer processor. Furthermore, the module 82*e* may be implemented as a separate block or may be combined with any other module/block of the device/TV set 82, or it may be split into several blocks according to their functionality.

The devices 82 and 84 can have similar components as the device 80, as shown in FIG. 6, so that the above discussions about components of the device 80 are fully applicable to the components of the devices 82 and 84. Displays 82*g* and 84*g* are conventional components for providing interface for the users with corresponding devices 82 and 84. Also location determination application modules 82*f* and 84*f* (such as GPS) can be used in the devices 82 and 84.

The accelerometer sensor 85 and gesture detection application module 84*e* in the mobile device 84 can be used for generating the captured signal comprising confirmation of detecting by the mobile device 84 a predefined mobile device movement provided by a user of the mobile device in response, for example, to information displayed on the first device 84, as described herein.

Figure 7:
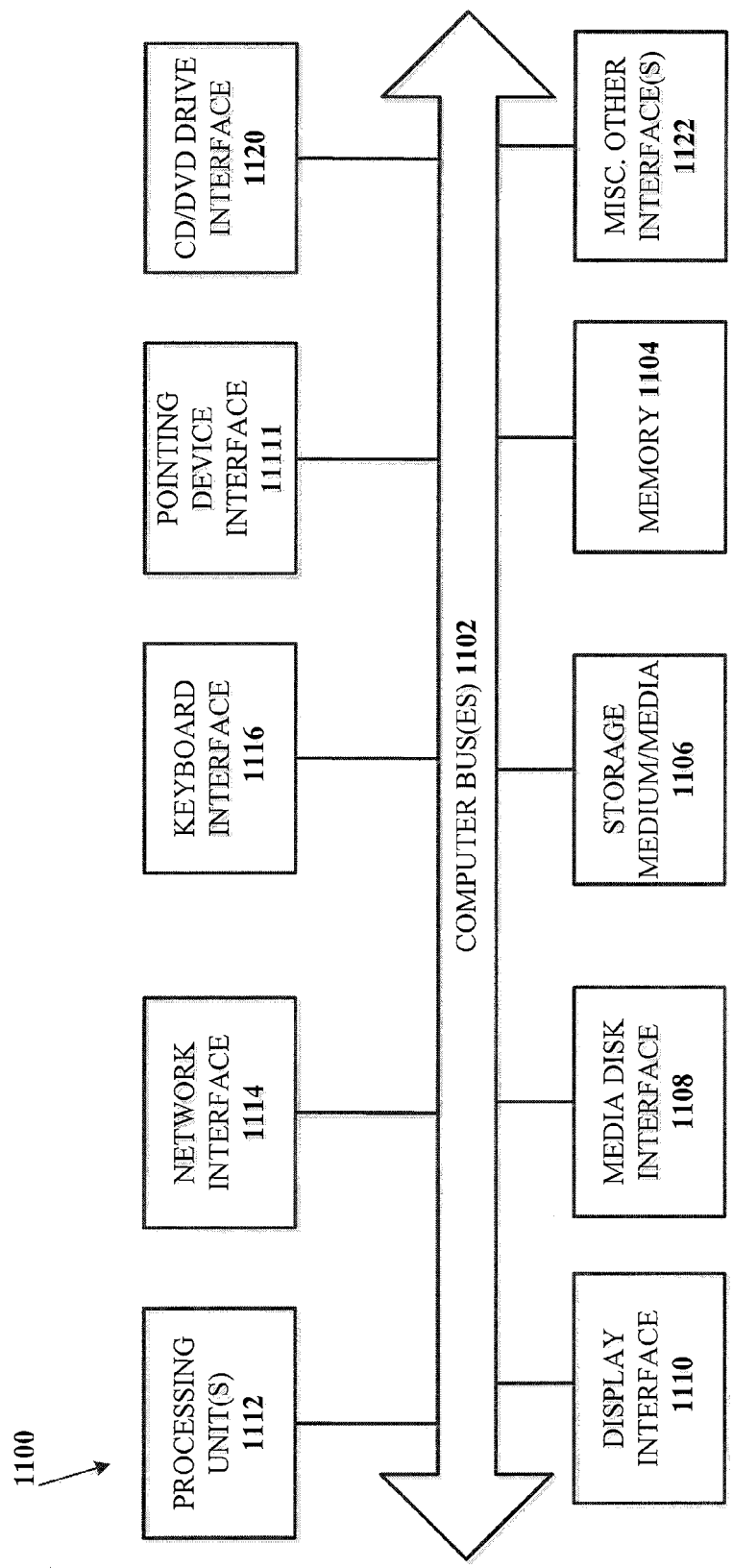
FIG. 7 is an exemplary internal architecture of a computing device for implementing embodiments described herein.
Figure 8:
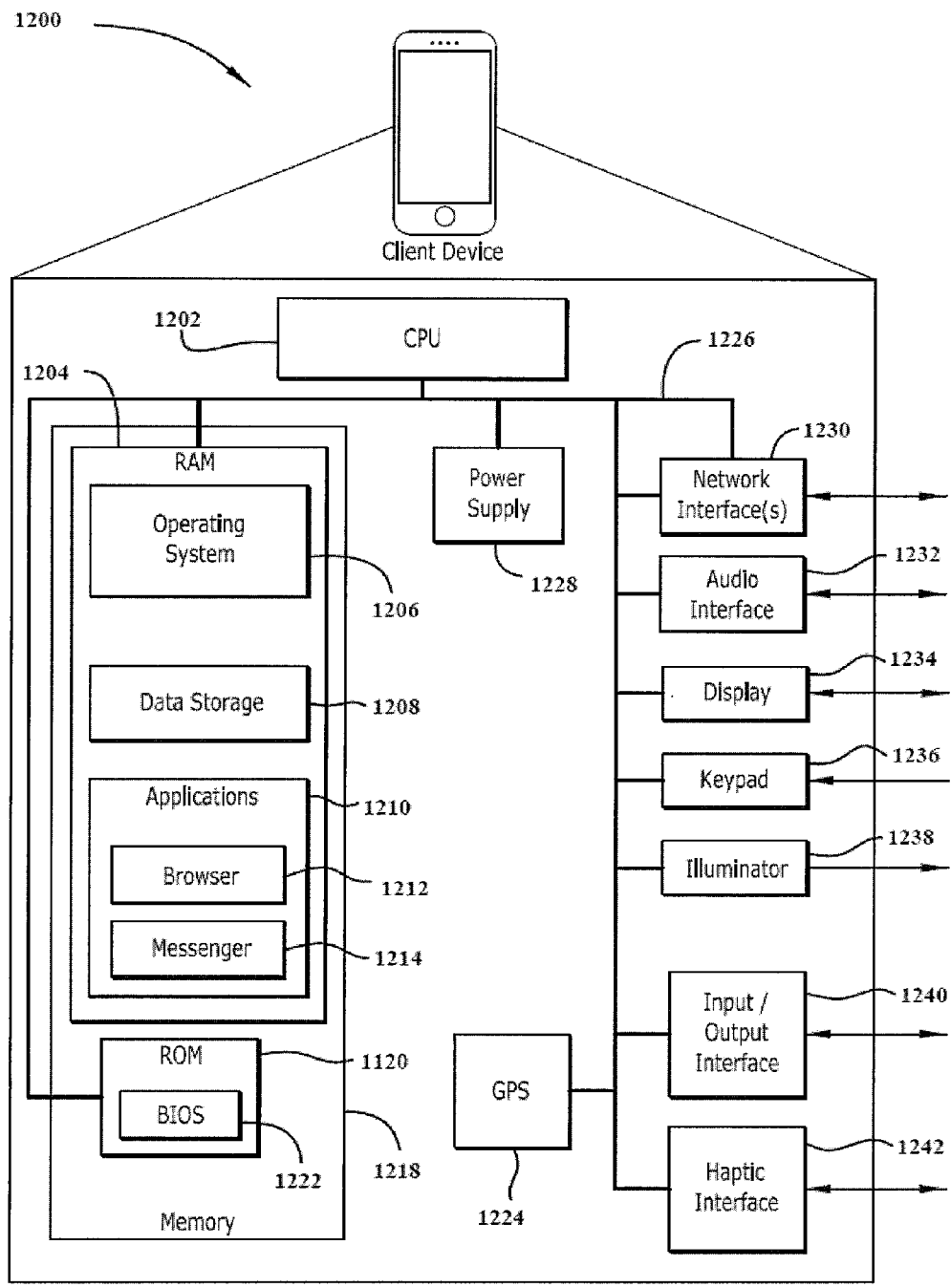
FIG. 8 is a further exemplary schematic diagram illustrating a device implementation of a computing device for implementing embodiments described herein.

FIGS. 7 and 8 provide further insight for implementation of various embodiments described herein using a computer device (e.g., see devices shown in FIG. 6). The devices depicted in FIGS. 7 and 8 may interchangeably or in combination perform any of the functions described herein.

As shown in the example of FIG. 7, internal architecture of a computing device 1100 includes one or more processing units (also referred to herein as CPUs) 1112, which interface with at least one computer bus 1102. Also interfacing with computer bus 1102 are persistent storage medium/media 1106, network interface 1114, memory 1104, e.g., random access memory (RAM), run-time transient memory, read only memory (ROM), etc., media disk drive interface 1108, an interface 1120 for a drive that can read and/or write to media including removable media such as floppy, CD-ROM, DVD, etc., media, display interface 1110 as interface for a monitor or other display device, keyboard interface 1116 as interface for a keyboard, pointing device interface 1118 as an interface for a mouse or other pointing device, and miscellaneous other interfaces 1122 not shown individually, such as parallel and serial port interfaces, a universal serial bus (USB) interface, and the like.

Memory 1104 interfaces with computer bus 1102 so as to provide information stored in memory 1104 to CPU 1112 during execution of software programs such as an operating system, application programs, device drivers, and software modules that comprise program code or logic, and/or computer-executable process steps, incorporating functionality described herein, e.g., one or more of process flows described herein. CPU 1112 first loads computer-executable process steps or logic from storage, e.g., memory 1104, storage medium/media 1106, removable media drive, and/or other storage device. CPU 1112 can then execute the stored process steps in order to execute the loaded computer-executable process steps. Stored data, e.g., data stored by a storage device, can be accessed by CPU 1112 during the execution of computer-executable process steps.

Persistent storage medium/media 1006 is a computer readable storage medium(s) that can be used to store software and data, e.g., an operating system and one or more application programs. Persistent storage medium/media 1006 can also be used to store device drivers, such as one or more of a digital camera driver, monitor driver, printer driver, scanner driver, or other device drivers, web pages, content files, metadata, playlists and other files. Persistent storage medium/media 1006 can further include program modules and data files used to implement one or more embodiments of the present disclosure.

FIG. 8 is a schematic diagram illustrating a client device implementation of a computing device in accordance with embodiments of the present disclosure. A client device 1200 may include a computing device capable of sending or receiving signals, such as via a wired or a wireless network, and capable of running application software or "apps". A client device may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like.

A client device may vary in terms of capabilities or features. The client device can include standard components such as a CPU 1202, power supply 1228, a memory 1218, ROM 1220, BIOS 1222, network interface(s) 1230, audio interface 1232, display 1234, keypad 1236, illuminator 1238, I/O interface 1240 interconnected via circuitry 1226. Claimed subject matter is intended to cover a wide range of potential variations. For example, the keypad 1236 of a cell phone may include a numeric keypad or a display 1234 of limited functionality, such as a monochrome liquid crystal display (LCD) for displaying text. In contrast, however, as another example, a web-enabled client device 1200 may include one or more physical or virtual keyboards 1236, mass storage, one or more accelerometers, one or more gyroscopes, global positioning system (GPS) 1224 or other location identifying type capability, Haptic interface 1242, or a display with a high degree of functionality, such as a touch-sensitive color 2D or 3D display, for example. The memory 1218 can include Random Access Memory 1204 including an area for data storage 1208.

A client device 1200 may include or may execute a variety of operating systems 1206, including a personal computer operating system, such as a Windows, iOS or Linux, or a mobile operating system, such as iOS, Android, or Windows Mobile, or the like. A client device 1200 may include or may execute a variety of possible applications 1210, such as a client software application 1214 enabling communication with other devices, such as communicating one or more messages such as via email, short message service (SMS), or multimedia message service (MMS), including via a network, such as a social network, including, for example, Facebook, LinkedIn, Twitter, Flickr, or Google+, to provide only a few possible examples. A client device 1200 may also include or execute an application to communicate content, such as, for example, textual content, multimedia content, or the like. A client device 1200 may also include or execute an application 1212 to perform a variety of possible tasks, such as browsing, searching, playing various forms of content, including locally stored or streamed content, such as, video, or games (such as fantasy sports leagues). The foregoing is provided to illustrate that claimed subject matter is intended to include a wide range of possible features or capabilities.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure a system or module is a software, hardware, or firmware (or combinations thereof), process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may be grouped into an engine or an application.

It is noted that various non-limiting embodiments described herein may be used separately, combined or selectively combined for specific applications.

Further, some of the various features of the above non-limiting embodiments may be used to advantage without the corresponding use of other described features. The foregoing description should therefore be considered as merely illustrative of the principles, teachings and exemplary embodiments of this invention, and not in limitation thereof.

It is to be understood that the above-described arrangements are only illustrative of the application of the principles of the present invention. Numerous modifications and alternative arrangements may be devised by those skilled in the art without departing from the scope of the invention, and the appended claims are intended to cover such modifications and arrangements.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the user computing device or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

What is claimed is:

1. A method comprising:
   receiving, by a server from a first device, a request for a gesture token, the request comprising a location of the first device;
   in response to the receiving of the request, determining, by the server, a first gesture token for the first device;
   storing, by the server, a first device entry comprising the location of the first device and the first gesture token in a data storage;
   in response to the receiving of the request for the gesture token, sending, by the server, a signal comprising the first gesture token to the first device, so that a predefined mobile device movement is provided to a mobile device in response to information displayed on the first device, the displayed information comprising instructions about the predefined mobile device movement and a link to an application or web page;
   receiving, by the server from the mobile device, a captured signal comprising a confirmation of detecting, by the mobile device, the predefined mobile device movement, the captured signal further comprising a location of the mobile device;
   matching, by the server, the received captured signal to stored entries comprising the first device entry; and
   when a match is uniquely found between the location of the first device and the location of the mobile device and between the first gesture token and the predefined mobile device movement,
   causing, by the server, the mobile device to download the application or display the web page.

2. The method of claim 1, wherein the data storage is located at the server.

3. The method of claim 1, wherein an accelerometer sensor in the mobile device is used for detecting said predefined mobile device movement.

4. The method of claim 1, wherein the first device is a stationary television set.

5. The method of claim 1, wherein the displayed information comprises a displayed phone number and an encouragement to send a text to the displayed phone number.

6. The method of claim 1, wherein the mobile device is a smart phone, a tablet, a portable computer or a wireless device.

7. The method of claim 1, wherein information displayed on the first device comprises an advertisement and instructions including the predefined mobile device movement for getting a coupon related to the advertisement, and when the match is found between the locations of the first device and the mobile device and between the first gesture token and the predefined mobile device movement confirmed in the captured signal, providing the coupon to the mobile device.

8. The method of claim 7, wherein content of the coupon is dependent on a personal information of the user of the mobile device.

9. The method of claim 1, wherein information displayed on the first device comprises instructions including the predefined mobile device movement for establishing a chatting session, and when the match is found between the locations of the first device and the mobile device and between the first gesture token and the predefined mobile device movement confirmed in the captured signal, providing a chat box to the first device and to the mobile device for chatting with other mobile devices.

10. The method of claim 1, wherein information displayed on the first device comprises instructions including the predefined mobile device movement for getting a special event displayed, and when the match is found between the locations of the first device and the mobile device and between the first gesture token and the predefined mobile device movement confirmed in the captured signal, providing the special event displayed on the mobile device.

11. An apparatus comprising:
a processor;
a storage medium for tangibly storing thereon program logic for execution by the processor, the program logic comprising:
receiving logic executed by the processor for receiving, from a first device, a request for a gesture token, the request comprising a location of the first device;
determining logic executed by the processor for, in response to the receiving of the request, determining a first gesture token for the first device;
storing logic executed by the processor for storing a first device entry comprising the location of the first device and the first gesture token in a data storage;
sending logic executed by the processor for, in response to the receiving of the request for the gesture token, sending, by the server, a signal comprising the first gesture token to the first device, so that a predefined mobile device movement is provided to the mobile device in response to information displayed on the first device, the displayed information comprising instructions about the predefined mobile device movement and a link to an application or web page;
second receiving logic executed by the processor for receiving, from a mobile device, a captured signal comprising a confirmation of detecting, by the mobile device, the predefined mobile device movement, the captured signal further comprising a location of the mobile device;
matching logic executed by the processor for determining when there is a match between the location of the first device and the location of the mobile device and between the first gesture token and the predefined mobile device movement; and
downloading logic executed by the processor for causing, by the server, the mobile device to download the application or display the web page.

12. The apparatus of claim 11, wherein an accelerometer sensor in the mobile device is used for detecting said predefined mobile device movement.

13. The apparatus of claim 11, wherein the first device is a stationary television set.

14. The apparatus of claim 11, wherein the displayed information comprises a displayed phone number and an encouragement to send a text to the displayed phone number.

15. The apparatus of claim 11, wherein the mobile device is a smart phone, a tablet, a portable computer or a wireless device.

16. The apparatus of claim 11, wherein information displayed on the first device comprises an advertisement and instructions including the predefined mobile device movement for getting a coupon related to the advertisement, and when the match is found between the locations of the first device and the mobile device and between the first gesture token and the predefined mobile device movement confirmed in the captured signal, providing the coupon to the mobile device.

17. The apparatus of claim 16, wherein content of the coupon is dependent on a personal information of the user of the mobile device.

18. The apparatus of claim 11, wherein information displayed on the first device comprises instructions including the predefined mobile device movement for establishing a chatting session, and when the match is found between the locations of the first device and the mobile device and between the first gesture token and the predefined mobile device movement confirmed in the captured signal, providing a chat box to the first device and to the mobile device for chatting with other mobile devices.

19. The apparatus of claim 11, wherein information displayed on the first device comprises instructions including the predefined mobile device movement for getting a special event displayed, and when the match is found between the locations of the first device and the mobile device and between the first gesture token and the predefined mobile device movement confirmed in the captured signal, providing the special event displayed on the mobile device.

20. A non-transitory computer readable storage medium tangibly storing computer program instructions capable of being executed by a computer processor, the computer program instructions defining code for:
receiving, by a server from a first device, a request for a gesture token, the request comprising a location of the first device;
in response to the receiving of the request, determining, by the server, a first gesture token for the first device;
storing, by the server, a first device entry comprising the location of the first device and the first gesture token in a data storage;
in response to the receiving of the request, sending, by the server, a signal comprising the first gesture token to the first device, so that a predefined mobile device movement is provided to the mobile device in response to information displayed on the first device, the displayed information comprising instructions about the predefined mobile device movement and a link to an application or web page;
receiving, by the server from a mobile device, a captured signal comprising a confirmation of detecting, by the mobile device, the predefined mobile device movement, the captured signal further comprising a location of the mobile device; and
when a match is uniquely found between the location of the first device and the location of the mobile device and between the first gesture token and the predefined mobile device movement, causing, by the server, the mobile device to download the application or display the web page.

\* \* \* \* \*